United States Patent
Oh

(10) Patent No.: US 11,294,386 B2
(45) Date of Patent: Apr. 5, 2022

(54) DEVICE AND METHOD FOR DETERMINING U-TURN STRATEGY OF AUTONOMOUS VEHICLE

(71) Applicants: HYUNDAI MOTOR COMPANY, Seoul (KR); KIA MOTORS CORPORATION, Seoul (KR)

(72) Inventor: Tae Dong Oh, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 241 days.

(21) Appl. No.: 16/595,626

(22) Filed: Oct. 8, 2019

(65) Prior Publication Data

US 2021/0004011 A1    Jan. 7, 2021

(30) Foreign Application Priority Data

Jul. 4, 2019    (KR) ........................ 10-2019-0080541

(51) Int. Cl.
| | |
|---|---|
| *G05D 1/02* | (2020.01) |
| *G05D 1/00* | (2006.01) |
| *G05D 1/08* | (2006.01) |
| *G06K 9/00* | (2006.01) |
| *G06N 3/08* | (2006.01) |

(52) U.S. Cl.
CPC ......... *G05D 1/0214* (2013.01); *G05D 1/0088* (2013.01); *G05D 1/0891* (2013.01); *G06K 9/00798* (2013.01); *G06K 9/00805* (2013.01); *G06N 3/08* (2013.01); *G05D 2201/0213* (2013.01)

(58) Field of Classification Search
CPC .. G05D 1/0214; G05D 1/0088; G05D 1/0891; G05D 2201/0213; G06K 9/00798; G06K 9/00805; G06K 9/6256; G06K 9/6273; G06N 3/08; G06N 3/0454; G06N 3/0445; G06N 3/0472; G08G 1/16; G08G 1/0112; G08G 1/0129; G08G 1/0145; B60W 2050/0088; B60W 60/0011
See application file for complete search history.

(56) References Cited

U.S. PATENT DOCUMENTS

| | | | |
|---|---|---|---|
| 2017/0336218 A1* | 11/2017 | Beaurepaire | G08G 1/167 |
| 2018/0362035 A1 | 12/2018 | Schein | |
| 2019/0113351 A1* | 4/2019 | Antony | G01C 21/3664 |
| 2020/0324763 A1* | 10/2020 | Switkes | G08G 1/161 |
| 2020/0348676 A1* | 11/2020 | Zhou | B60W 60/001 |

* cited by examiner

*Primary Examiner* — Marthe Y Marc-Coleman
(74) *Attorney, Agent, or Firm* — Lempia Summerfield Katz LLC

(57) ABSTRACT

A device and a method for determining a U-turn strategy of an autonomous driving vehicle is disclosed. The device for determining a U-turn strategy of an autonomous driving vehicle includes a learning device that learns a U-turn strategy for each situation by dividing situation information to be considered in a U-turn of the autonomous driving vehicle into groups, and a controller that determines the U-turn strategy of the autonomous driving vehicle based on the U-turn strategy for each situation learned by the learning device.

20 Claims, 23 Drawing Sheets

DEVICE AND METHOD FOR DETERMINING U-TURN STRATEGY OF AUTONOMOUS VEHICLE

CROSS-REFERENCE TO RELATED APPLICATION

This application claims priority to and the benefit of Korean Patent Application No. 10-2019-0080541, filed on Jul. 4, 2019, the entire contents of which are incorporated herein by reference.

FIELD

The present disclosure relates to a technology for determining a U-turn strategy of an autonomous vehicle based on a deep learning.

BACKGROUND

The statements in this section merely provide background information related to the present disclosure and may not constitute prior art.

In general, a deep learning or deep neural network is a kind of a machine learning. The deep neural network is composed of Artificial Neural Network (ANN) having several layers between an input layer and an output layer. Such an artificial neural network may include a convolution neural network (CNN) or a recurrent neural network (RNN) based on a structure and a problem to be solved, a purpose, or the like.

The deep learning is used to solve various problems such as classification, regression, localization, detection, segmentation, or the like. Especially, in an autonomous driving system, semantic segmentation and object detection that may identify locations and types of dynamic and static obstacles are significantly used.

The semantic segmentation refers to segmentation of an image into pixels having the same meaning, by performing a classification prediction on a pixel basis, to find an object in the image. Thus, not only an object existing in the image but also positions of pixels having the same meaning (same object) may be precisely identified.

The object detection refers to classifying and predicting types of objects in the image and performing a regress prediction on a bounding box to find position information of the objects. Thus, unlike the simple classification, not only the types of the objects in the image but also the position information of the objects may be identified.

A technology for determining a U-turn strategy of an autonomous driving vehicle based on such deep learning has not been proposed.

SUMMARY

The present disclosure has been made to solve the above-mentioned problems occurring in the prior art while advantages achieved by the prior art are maintained intact.

An aspect of the present disclosure provides a device and a method for determining a U-turn strategy of an autonomous driving vehicle that may perform a deep learning by dividing various situation information to be considered for safety during a U-turn of the autonomous driving vehicle into groups and determine a U-turn strategy of the autonomous driving vehicle based on such learned result, thereby generating an optimal travel route in the U-turn process of the autonomous driving vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for determining a U-turn strategy of an autonomous driving vehicle includes: a learning device that learns a U-turn strategy for each situation by dividing situation information to be considered in a U-turn of the autonomous driving vehicle into groups, and a controller that determines the U-turn strategy of the autonomous driving vehicle based on the U-turn strategy for each situation learned by the learning device.

In one form, the device may further include storage configured to store a plurality of U-turn strategies for each situation.

In another form, the plurality of U-turn strategies may be matched with scores corresponding to the learning result, respectively, and stored. In this connection, the plurality of U-turn strategies may include at least two U-turn strategies among a first U-turn strategy of a U-turn with a first radius, a second U-turn strategy of a U-turn with a second radius, a third U-turn strategy of a U-turn following after a U-turn of a preceding vehicle, a fourth U-turn strategy of a U-turn restarted after a short stop during the U-turn, and a fifth U-turn strategy of a U-turn restarted after reversing during the U-turn.

In one form, the controller may determine a U-turn strategy having a highest score among the plurality of U-turn strategies corresponding to a current situation as the U-turn strategy of the autonomous driving vehicle.

In one form, the controller may adjust a score of each U-turn strategy corresponding to a current situation based on a risk obtained during the U-turn of the autonomous driving vehicle. In this connection, the risk may be the number of warnings of a collision with a surrounding obstacle (vehicle, object, or the like).

In another form, the device may further include an input device that inputs data for each group for situation information at a current time point.

In one form, the input device may include at least one of data extracting device among: a first data extracting device configured to extract first group data for inhibiting a collision with a preceding vehicle U-turning ahead in front of the autonomous driving vehicle when the autonomous driving vehicle is U-turning, a second data extracting device configured to extract second group data for inhibiting a collision with a neighboring vehicle during the U-turn of the autonomous driving vehicle, a third data extracting device configured to extract third group data for inhibiting a collision with a pedestrian during the U-turn of the autonomous driving vehicle, a fourth data extracting device configured to extract, as fourth group data, lighting states of various traffic lights located in front of the autonomous driving vehicle during the U-turn of the autonomous driving vehicle, a fifth data extracting device configured to extract a drivable region based on a distribution of static objects, a drivable region based on a construction section, and a drivable region based on an accident section as fifth group data, a sixth data extracting device configured to extract a drivable region based on a structure of a road as sixth group data, and/or a seventh data extracting device configured to extract an overlapping region of the drivable region extracted by the fifth data extracting device and the drivable region extracted by the sixth data extracting device as seventh group data.

In one form, the first group data may include at least one of a lighting state of a traffic light, a yaw rate, and/or a cumulative value of a longitudinal acceleration over time, the second group data may include at least one of a position, a speed, an acceleration, a yaw rate, and/or a direction of traveling of the neighboring vehicle, and the third group data may include at least one of a location, a speed, a direction of traveling, and/or a precise map of surroundings of the pedestrian.

According to another aspect of the present disclosure, a method for determining a U-turn strategy of an autonomous driving vehicle includes learning, by a learning device, a U-turn strategy for each situation by dividing situation information to be considered in a U-turn of the autonomous driving vehicle into groups, and determining, by a controller, the U-turn strategy of the autonomous driving vehicle based on the U-turn strategy for each situation learned by the learning device.

In one form, the method may further include storing, by storage, a plurality of U-turn strategies for each situation.

In one form, the plurality of U-turn strategies may be matched with scores corresponding to the learning result, respectively, and stored. In this connection, the plurality of U-turn strategies may include at least two of a first U-turn strategy of a U-turn with a first radius, a second U-turn strategy of a U-turn with a second radius, a third U-turn strategy of a U-turn following after a U-turn of a preceding vehicle, a fourth U-turn strategy of a U-turn restarted after a short stop during the U-turn, and/or a fifth U-turn strategy of a U-turn restarted after reversing during the U-turn.

In one form, the determining of the U-turn strategy of the autonomous driving vehicle may include determining a U-turn strategy having a highest score among a plurality of U-turn strategies corresponding to a current situation as the U-turn strategy of the autonomous driving vehicle.

In one form, the method may further include adjusting, by the controller, a score of each U-turn strategy corresponding to a current situation based on a risk obtained during the U-turn of the autonomous driving vehicle. In this connection, the risk may be the number of collision warnings.

In one form, the method may further include inputting, by an input device, data for each group for situation information at a current time point.

In one form, the inputting of the data for each group may include extracting first group data for inhibiting a collision with a preceding vehicle U-turning ahead in front of the autonomous driving vehicle when the autonomous driving vehicle is U-turning, extracting second group data for inhibiting a collision with a neighboring vehicle during the U-turn of the autonomous driving vehicle, extracting third group data for inhibiting a collision with a pedestrian during the U-turn of the autonomous driving vehicle, extracting, as fourth group data, lighting states of various traffic lights located in front of the autonomous driving vehicle during the U-turn of the autonomous driving vehicle, extracting a drivable region based on a distribution of static objects, a drivable region based on a construction section, and a drivable region based on an accident section as fifth group data, extracting a drivable region based on a structure of a road as sixth group data, and extracting an overlapping region of the drivable region of the fifth group data and the drivable region of the sixth group data as seventh group data.

In one form, the first group data may include at least one of a lighting state of a traffic light, a yaw rate, and/or a cumulative value of a longitudinal acceleration over time, the second group data may include at least one of a position, a speed, an acceleration, a yaw rate, and/or a direction of traveling of the neighboring vehicle, and the third group data may include at least one of a location, a speed, a direction of traveling, and/or a precise map of surroundings of the pedestrian.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
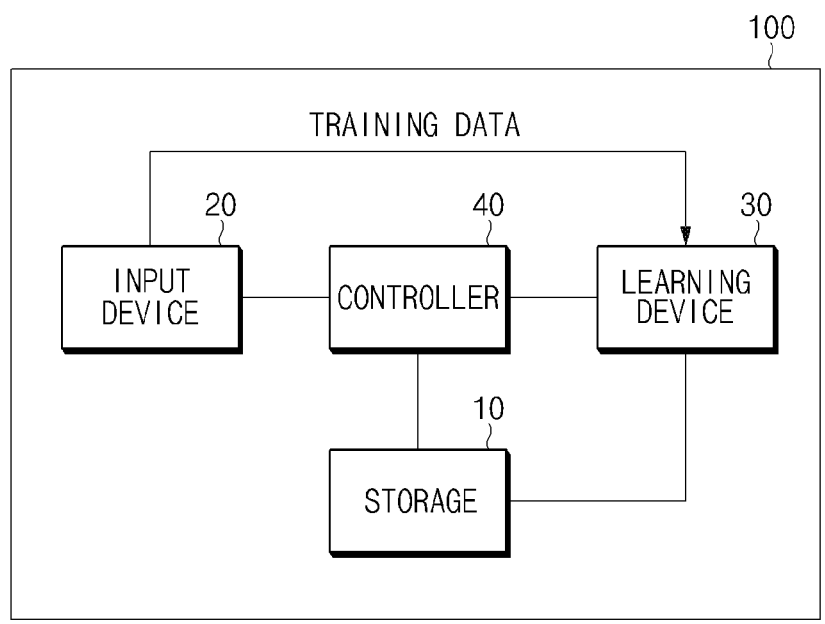
FIG. 1 is a block diagram of a U-turn strategy determining device of an autonomous driving vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary forms of the present disclosure will be described in detail with reference to the exemplary drawings. Further, in describing the forms of the present disclosure, a detailed description of the related known configuration or function will be omitted when it is determined that it interferes with the understanding of the form of the present disclosure.

In describing the components of the form according to the present disclosure, terms such as first, second, A, B, (a), (b), and the like may be used. These teams are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one form of the present disclosure, information is used as a concept including data.

FIG. 1 is a block diagram of a U-turn strategy determining device of an autonomous driving vehicle according to one form of the present disclosure.

As shown in FIG. 1, a U-turn strategy determining device 100 of an autonomous driving vehicle may include storage 10, an input device 20, a learning device 30, and a controller 40. In this connection, depending on a scheme for implementing the U-turn strategy determining device 100 of the autonomous driving vehicle according to an form of the present disclosure, each component may be combined with each other to be implemented as one component or some components may be omitted. In particular, the learning device 30 may be implemented to be included in the controller 40 as one functional block of the controller 40.

First, each of the component will be described. First, the storage 10 may store various logic, algorithms, and programs required for a process of performing a deep learning by dividing various situation information to be considered for safety during U-turn of the autonomous driving vehicle into groups and a process of determining a U-turn strategy of the autonomous driving vehicle based on such learned result.

The storage 10 may store, in one example, a U-turn strategy model for each situation as a result of learning by the learning device 30.

The storage 10 may store a plurality of U-turn strategies for each situation. In this connection, each U-turn strategy may have a score corresponding to the learning result. In this connection, the score represents a possibility of being selected as the U-turn strategy.

For example, in a specific situation, when a score of a first U-turn strategy is 80%, a score of a second U-turn strategy is 10%, a score of a third U-turn strategy is 5%, a score of a fourth U-turn strategy is 3%, and a score of a fifth U-turn strategy is 2%, the U-turn strategy in the specific situation may be determined as the first U-turn strategy with the highest score.

The storage 10 may include at least one type of a storage medium of at least one type of memory such as a flash memory type, a hard disk type, a micro type, and a card type (for example, an SD card (Secure Digital Card) or an XD card (eXtream Digital Card)), and the like, and a RAM (Random Access Memory), SRAM (Static RAM), ROM (Read Only Memory), PROM (Programmable ROM), EEPROM (Electrically Erasable PROM), MRAM (Magnetic RAM), a magnetic disk, and an optical disk type memory.

Next, the input device 20 may input (provide) data (training data) required in a process of learning an optimal U-turn strategy for each situation to the learning device 30.

In addition, the input device 20 may perform a function of inputting, to the controller 40, data at a current time point desired in the process of determining the U-turn strategy of the autonomous driving vehicle.

Next, the learning device 30 learns the training data input via the input device 20 based on the deep learning. In this connection, the training data has a form in which various situation information to be considered for the safety during the U-turn of the autonomous driving vehicle is divided into the groups. That is, the learning device 30 learns the optimal U-turn strategy for each situation. In this connection, the U-turn strategy is as shown in FIGS. 2A to 2E.

FIGS. 2A to 2E are exemplary diagrams of U-turn strategies that are learned for each situation by a U-turn strategy determining device of an autonomous driving vehicle according to one form of the present disclosure.

Figure 2A:
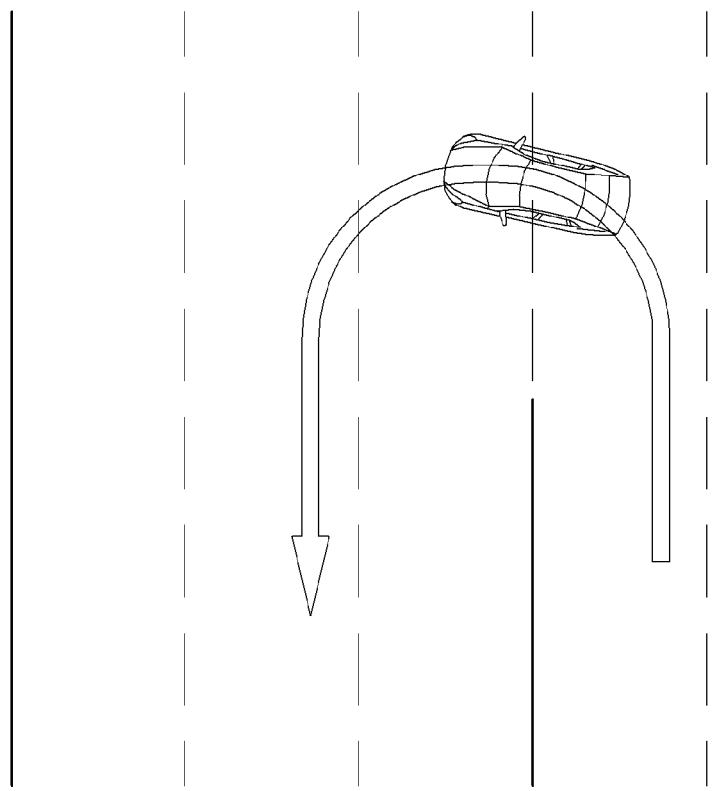
FIGS. 2A to 2E are exemplary diagrams of U-turn strategies that are learned for each situation by a U-turn strategy determining device of an autonomous driving vehicle.
Figure 2B:
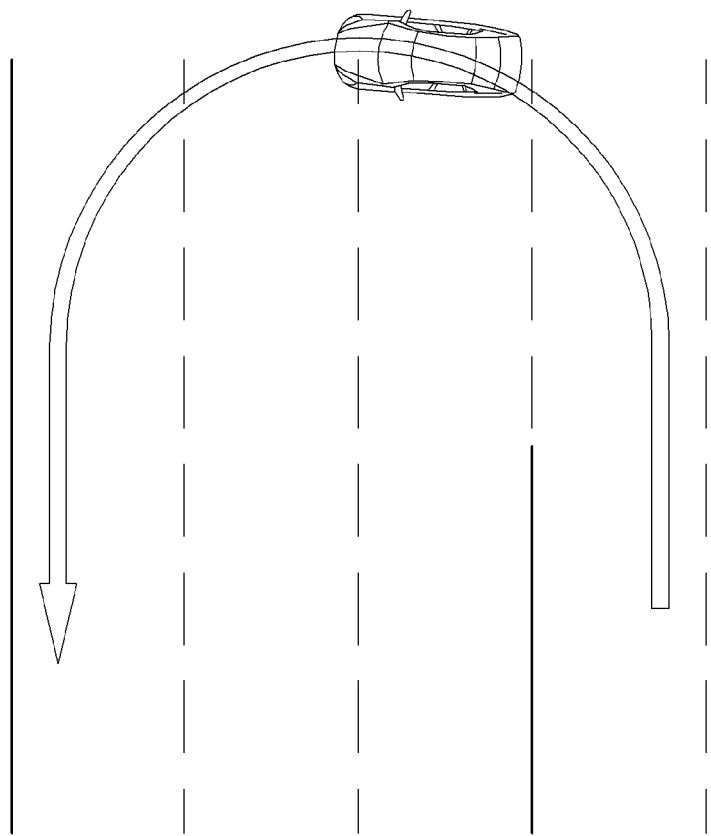
Figure 2C:
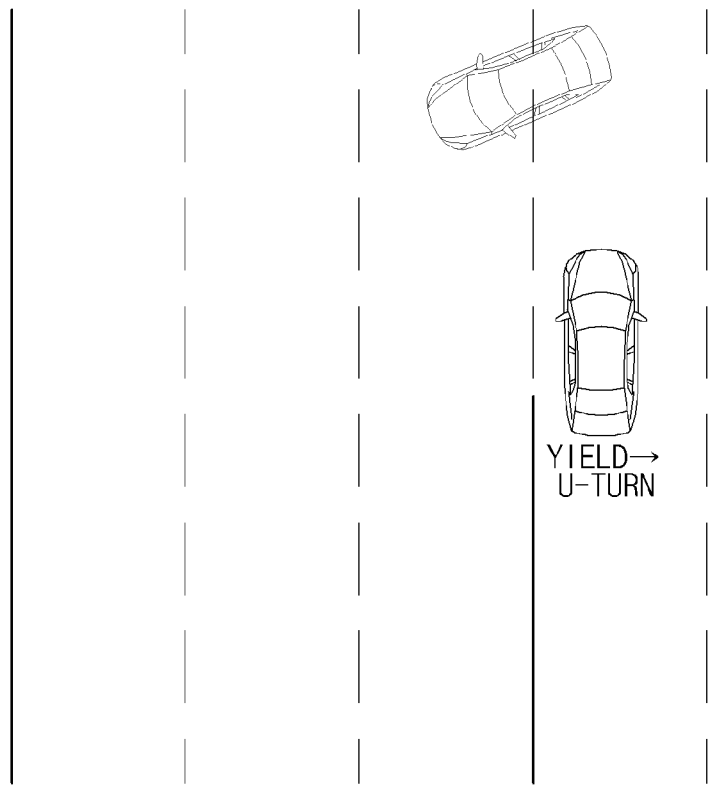
Figure 2D:
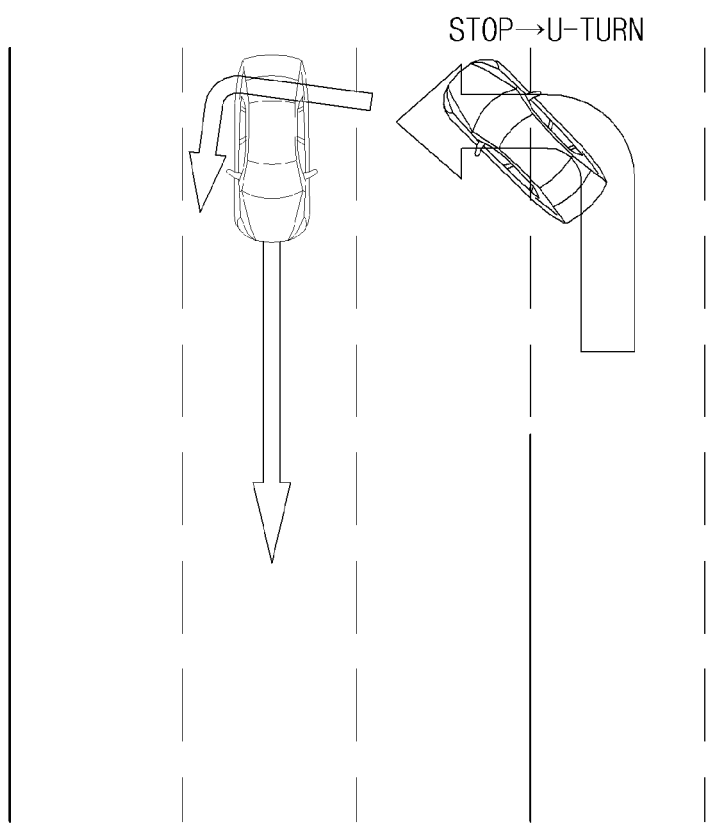
Figure 2E:
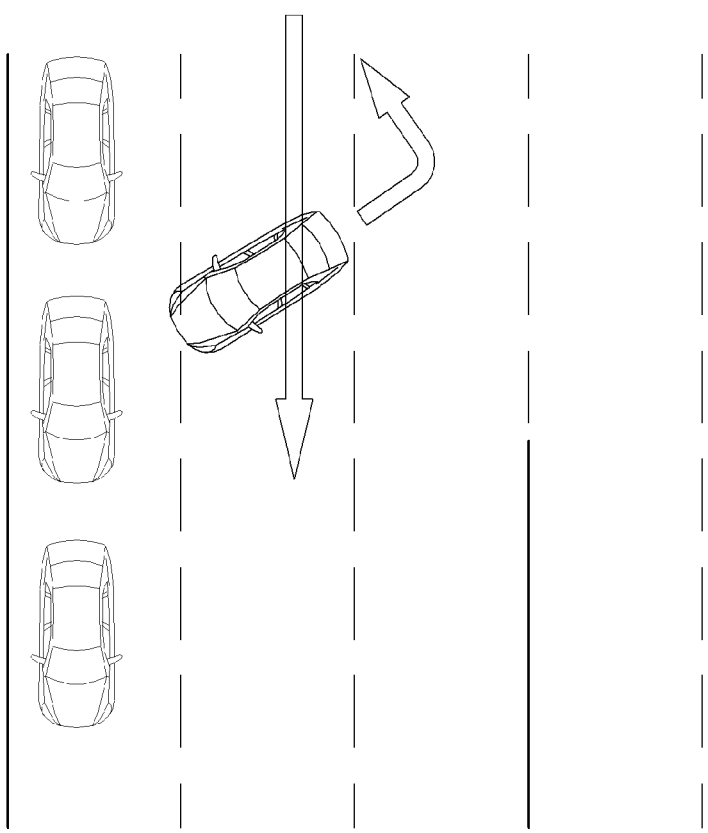

FIG. 2A illustrates a type of U-turn with a small radius (a first radius, for example within 3 m) as the first U-turn strategy. FIG. 2B illustrates a type of U-turn with a large radius (a second radius, for example larger than 3 m) as the second U-turn strategy. FIG. 2C illustrates a type of U-turn that follows after a U-turn of a preceding vehicle, as the third U-turn strategy. FIG. 2D illustrates a type of a U-turn restarted after a short stop (after a neighboring vehicle passes) during the U-turn. Further, FIG. 2E illustrates a type of a U-turn restarted after reversing during the U-turn.

Although one form of the present disclosure has been described using five U-turn strategies as an example, the number of U-turn strategies may vary depending on an intention of a designer, but does not affect the present disclosure.

In one example, the learning device 30 may perform the learning in various manners. In one example, the learning device 30 may perform the learning based on a simulation in an early stage when the learning is not performed at all. In a middle stage of the learning when the learning has been performed some extent, the learning device 30 may perform the learning based on a cloud server (not shown). After the learning is completed, the learning device 30 may perform additional learning based on an individual's U-turn propensity. In this connection, the cloud server collects various situation information from a plurality of vehicles performing U-turns and infrastructures, and provides the collected situation information to the autonomous driving vehicle as the training data.

Next, the controller 40 performs overall control such that the respective components may normally perform functions thereof. In this connection, the controller 40 may be implemented in hardware or software, or in a combination thereof. In one form, the controller 40 may be implemented in a microprocessor, but is not limited thereto.

In particular, the controller 40 may perform the deep learning by dividing the various situation information to be considered for the safety during the U-turn of the autonomous driving vehicle into the groups and perform the various controls desired in the process of determining the U-turn strategy of the autonomous driving vehicle based on such learned result.

The controller 40 may determine the U-turn strategy of the autonomous driving vehicle by applying data about a surrounding situation at the current time point input via the input device 20 to the learning result of the learning device 30.

The controller 40 may adjust the score of each U-turn strategy for each situation stored in the storage 10 based on a risk (e.g., the number of collision warnings) acquired in the U-turn process of the autonomous driving vehicle.

For example, in the specific situation, when the score of the first U-turn strategy is 80%, the score of the second U-turn strategy is 10%, the score of the third U-turn strategy is 5%, the score of the fourth U-turn strategy is 3%, and the score of the fifth U-turn strategy is 2%, the score of the first U-turn strategy may be reduced from 80% to 70% and the score of the second U-turn strategy may be increased from 10% to 20% based on the number of risks occurred in a process of a U-turn based on the first U-turn strategy. When the risk occurs frequently when the first U-turn strategy is applied in the specific situation, the score of the second U-turn strategy may become greater than the score of the first U-turn strategy.

Figure 3:
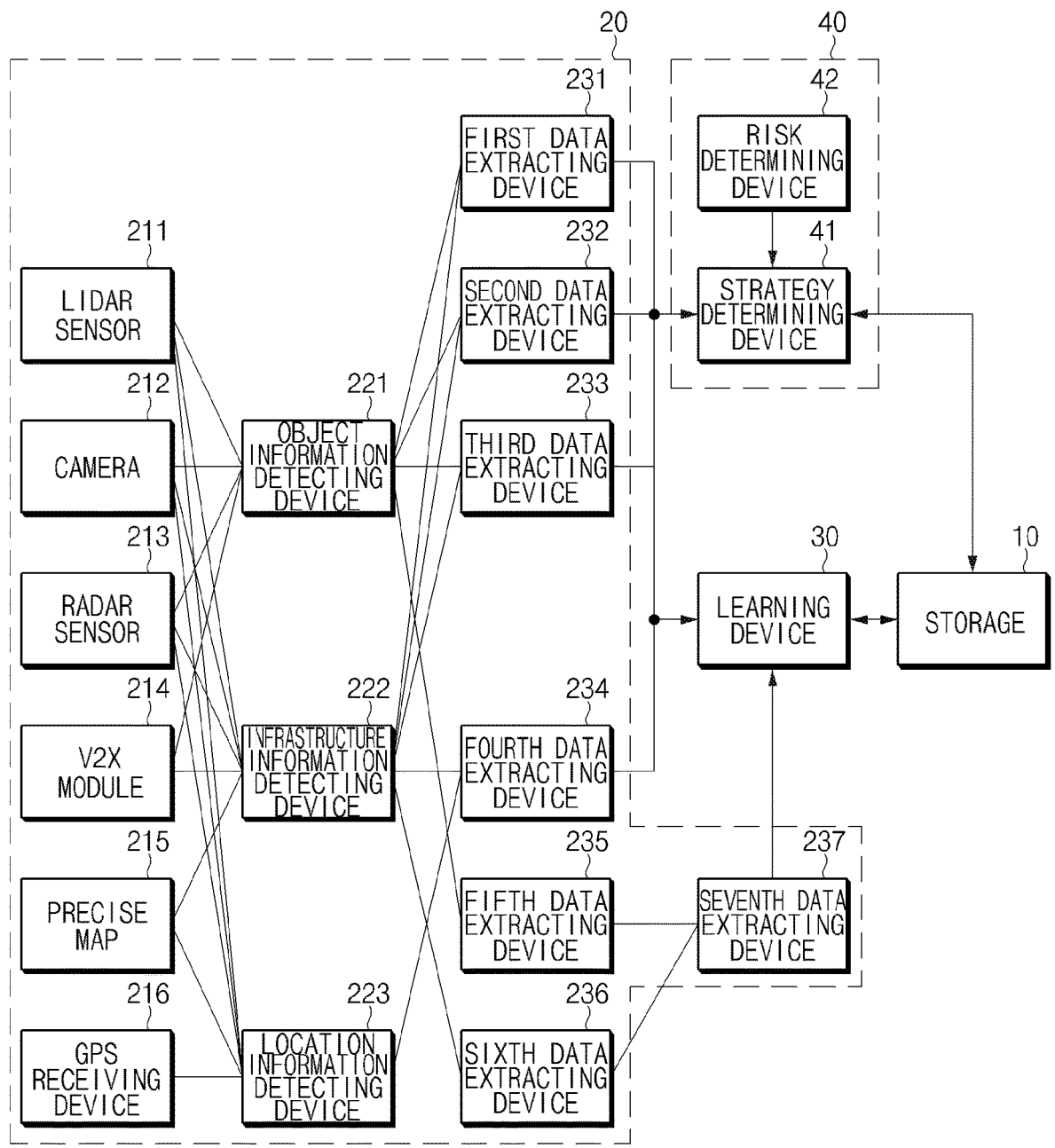
FIG. 3 is a detailed block diagram of a U-turn strategy determining device of an autonomous driving vehicle.

FIG. 3 is a detailed block diagram of a U-turn strategy determining device of an autonomous driving vehicle according to one form of the present disclosure.

As shown in FIG. 3, the input device 20 may include a LiDAR (Light Detection And Ranging) sensor 211, a camera 212, a RaDAR (Radio Detecting And Ranging) sensor 213, a V2X module 214, a precise map 215, a global positioning system (GPS) receiving device 216, and a vehicle network 217.

The LiDAR sensor 211, which is a type of an environment recognition sensor, measures a position coordinate and the like of a reflector based on a time in which the LiDAR sensor shoots a laser in all directions while being mounted on the autonomous vehicle and rotating and then the laser is reflected and returned.

The camera 212 is mounted on a rear face of an interior room mirror of the autonomous driving vehicle to shoot an image including a lane, vehicle, people, and the like located around the vehicle.

The RaDAR sensor 213 receives an electromagnetic wave reflected from an object after the electromagnetic wave is emitted, and measures a distance to the object, a direction of the object, and the like. The RaDAR sensor 213 may be mounted on a front bumper and a rear and side of the autonomous driving vehicle, and may recognize an object at a long distance and are hardly affected by a weather.

The V2X module 214 may include a V2V module (Vehicle to Vehicle, not shown) and a V2I module (Vehicle to Infrastructure, not shown). The V2V module may communicate with neighboring vehicles to obtain a position, a speed, an acceleration, a yaw rate, a direction of travel, and the like. Further, the V2I module may obtain a shape of a road, a surrounding structure, and traffic light information (location and lighting state (red, yellow, green, or the like)) from the infrastructure.

The precise map 215, which is a map for autonomous driving, may include lanes, traffic lights, sign information, and the like for accurate positioning of the vehicle and enhanced safety of the autonomous driving.

The GPS receiving device 216 receives GPS signals from at least three GPS satellites.

In addition, the input device 20 may include an object information detecting device 221, an infrastructure information detecting device 222, and a location information detecting device 223.

The object information detecting device 221 detects information of an object around the autonomous driving vehicle based on the LiDAR sensor 211, the camera 212, the RaDAR sensor 213, and the V2X module 214. In this connection, the object includes a vehicle, a person, and an object located on a road. Further, the object information, which is information about the object, may include the vehicle speed, the acceleration, the yaw rate, a cumulative value of longitudinal acceleration over time, and the like.

The infrastructure information detecting device 222 detects infrastructure information around the autonomous driving vehicle based on the LiDAR sensor 211, the camera 212, the RaDAR sensor 213, the V2X module 214, and the precise map 215. In this connection, the infrastructure information includes the shape of the road (lanes, central divider, or the like), the surrounding structure, the traffic light lighting state, an outline of the crosswalk, a boundary face of the road, and the like.

The location information detecting device 223 detects the location information of the autonomous driving vehicle based on the precise map 215, the GPS receiving device 216, and the vehicle network 217.

In addition, the input device 20 may include a first data extracting device 231, a second data extracting device 232, a third data extracting device 233, a fourth data extracting device 234, a fifth data extracting device 235, a sixth data extracting device 236, and a seventh data extracting device 237.

Hereinafter, referring to FIGS. 4 to 10, the process of dividing the various situation information to be considered for the safety during the U-turn of the autonomous driving vehicle into the groups will be described.

Figure 4:
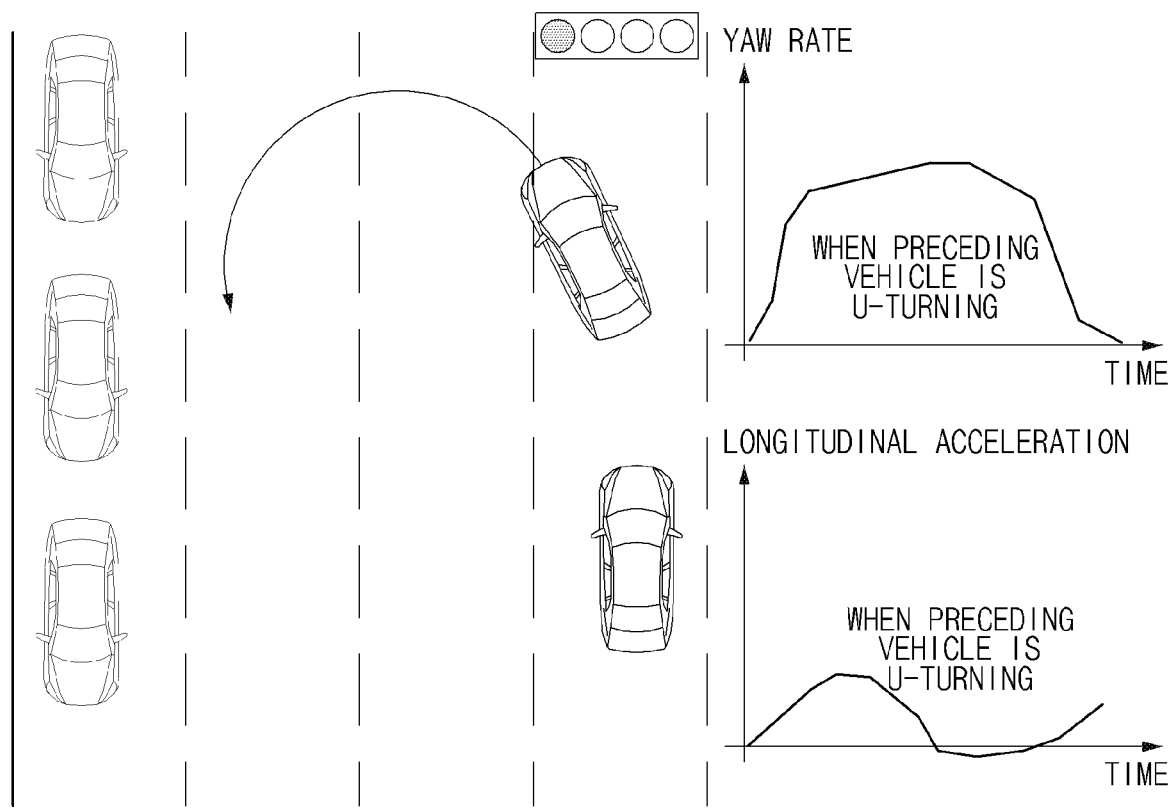
FIG. 4 illustrates a situation in which a first data extracting device, which is included in a U-turn strategy determining device of an autonomous driving vehicle, extracts first group data.

As shown in FIG. 4, the first data extracting device 231 extracts, from the object information and the infrastructure information, first group data for inhibiting a collision with a preceding vehicle that is U-turning ahead in front of the autonomous driving vehicle when the autonomous driving vehicle is U-turning. In this connection, the first group data, which is data related to a behavior of the preceding vehicle, may include the lighting state of the traffic light, the yaw rate, and the cumulative value of the longitudinal acceleration over time.

Figure 5A:
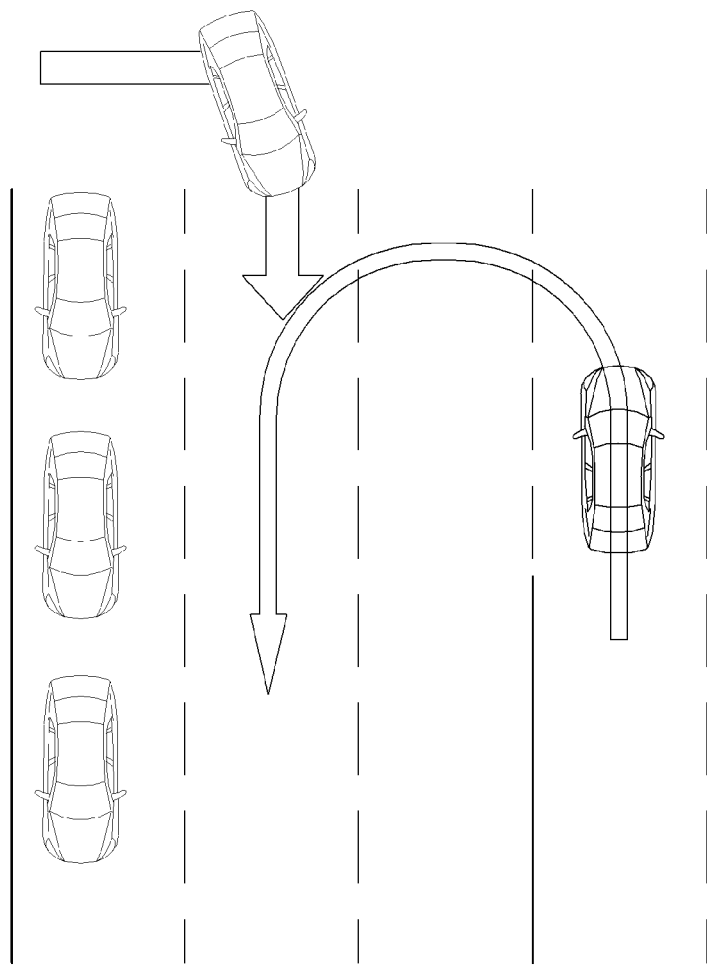
FIGS. 5A to 5C illustrate situations in which a second data extracting device, which is included in a U-turn strategy determining device of an autonomous driving vehicle, extracts second group data.
Figure 5B:
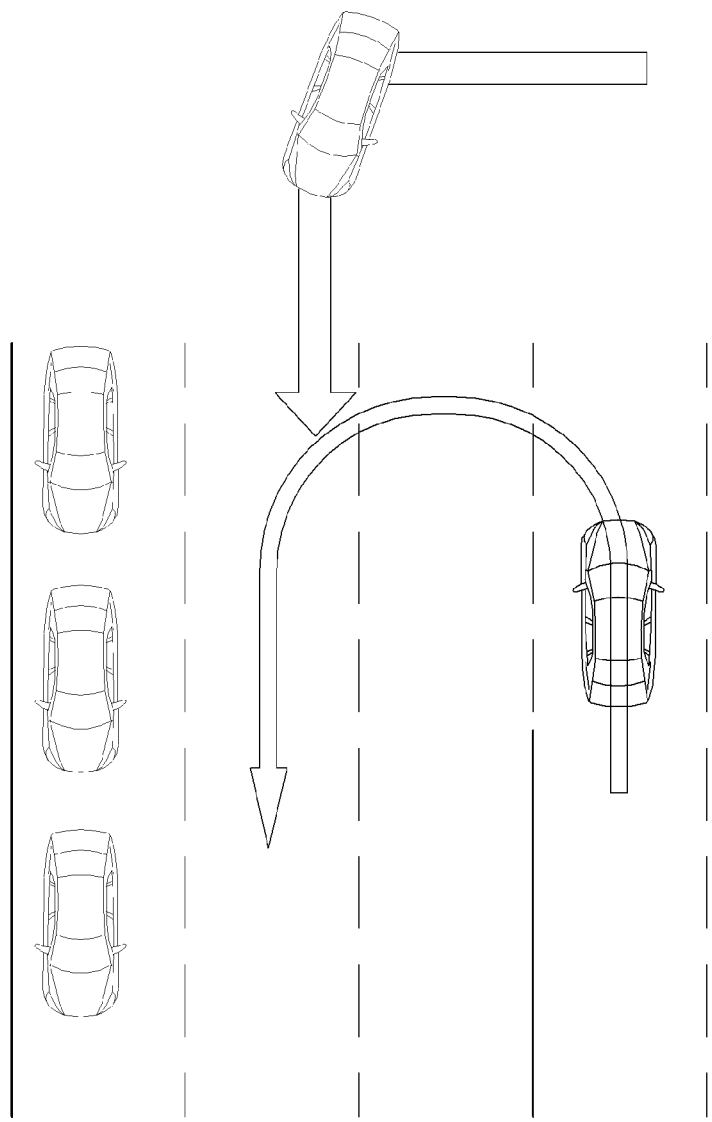
Figure 5C:
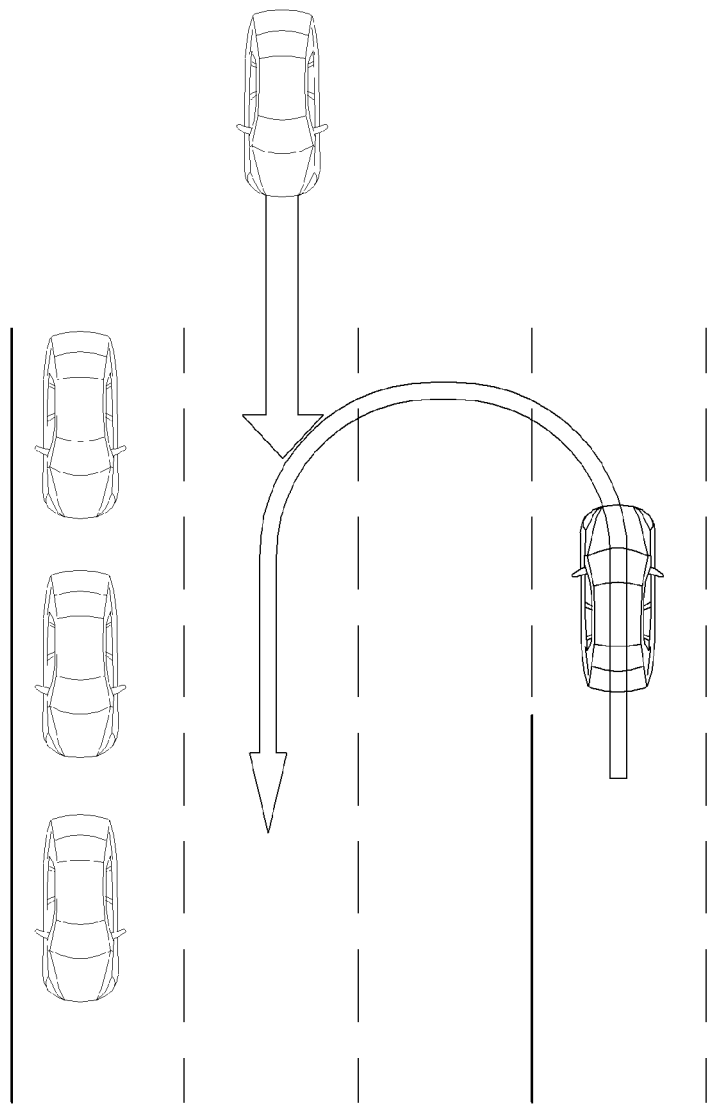

As shown in FIGS. 5A to 5C, the second data extracting device 232 extracts, from the object information and the infrastructure information, second group data for inhibiting a collision with a neighboring vehicle during the U-turn of the autonomous driving vehicle. In this connection, the second group data may include position, speed, acceleration, yaw rate, direction of traveling, and the like of the neighboring vehicle.

FIG. 5A illustrates a case in which a collision with a right-turning vehicle, which is as the neighboring vehicle, occurs. FIG. 5B illustrates a case in which a collision with a left-turning vehicle, which is as the neighboring vehicle, occurs. Further, FIG. 5C illustrates a case in which a collision with a vehicle traveling straight in a direction of the autonomous driving vehicle, which is as the neighboring vehicle, occurs.

Figure 6A:
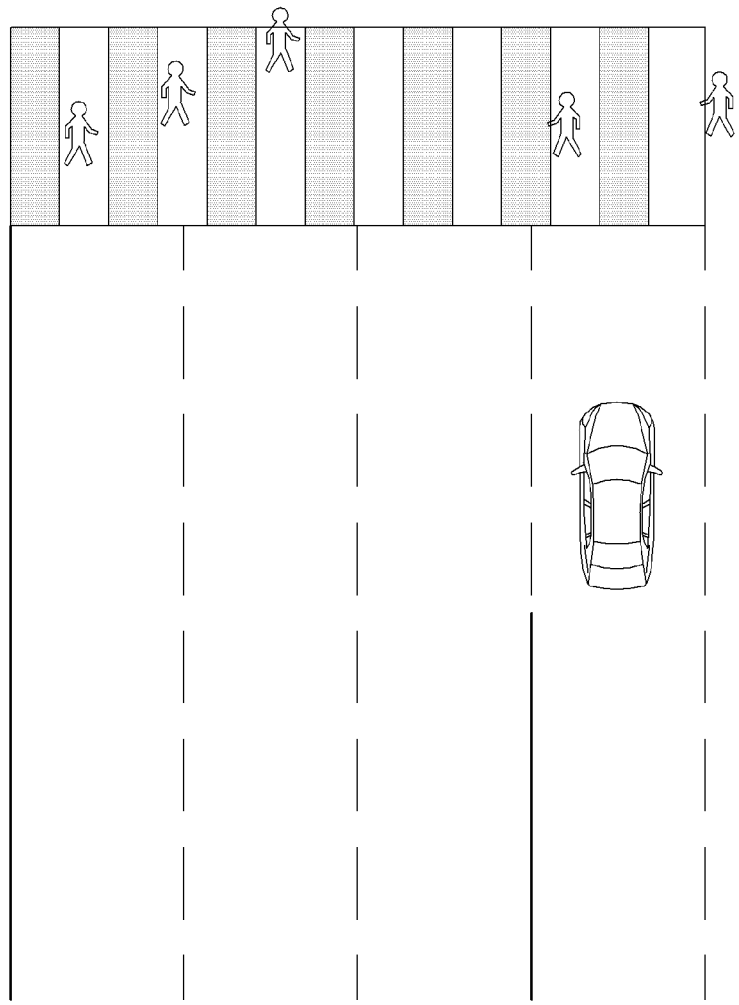
FIGS. 6A to 6C illustrate situations in which a third data extracting device, which is included in a U-turn strategy determining device of an autonomous driving vehicle, extracts third group data.
Figure 6B:
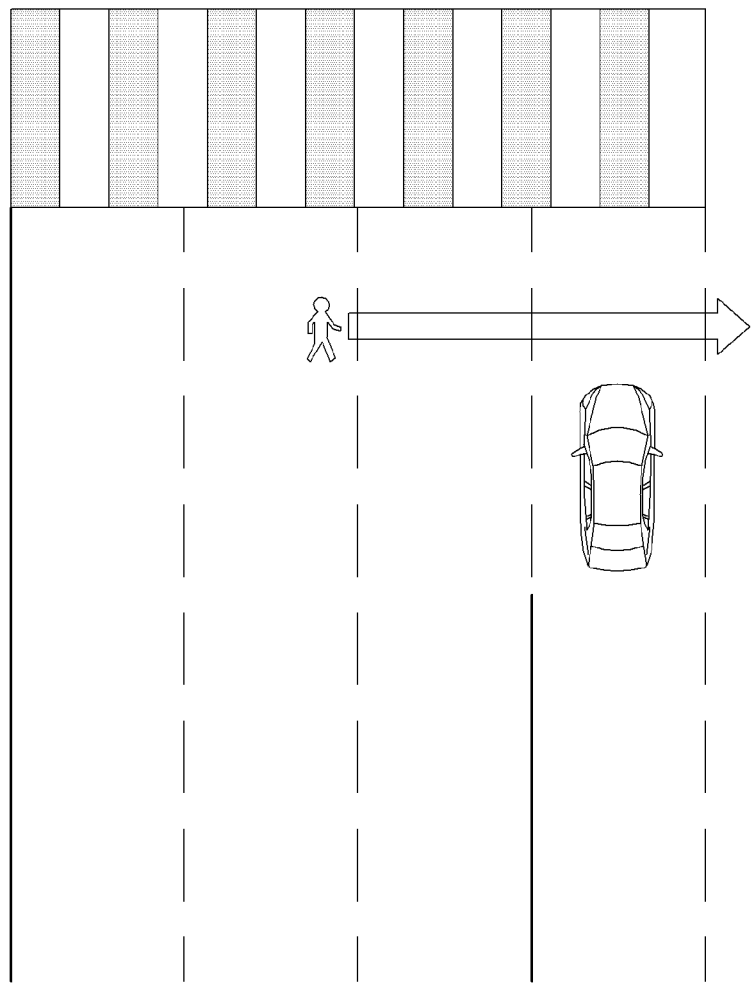
Figure 6C:
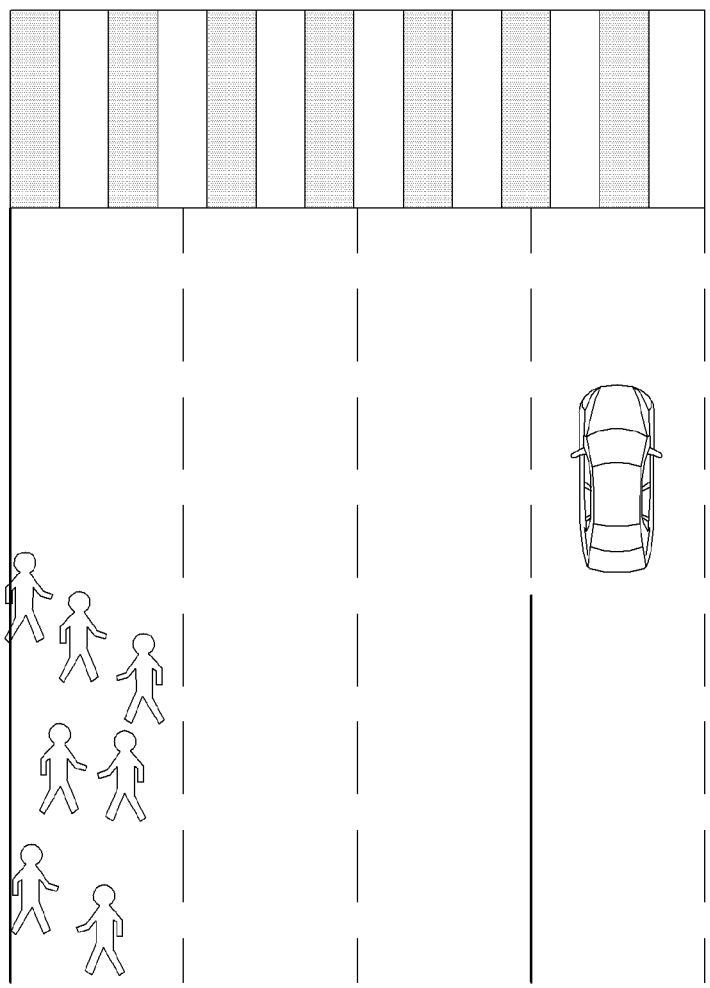

As shown in FIGS. 6A to 6C, the third data extracting device 233 extracts, from the object information and the infrastructure information, third group data for inhibiting a collision with a pedestrian during the U-turn of the autonomous driving vehicle. In this connection, the third group data may include location, speed, traveling direction, precise map of surroundings, and the like of the pedestrian.

FIG. 6A illustrates a case in which a pedestrian is crossing a crosswalk. FIG. 6B illustrates a case in which a pedestrian is crossing a road. Further, FIG. 6C illustrates a case in which pedestrians are hanging around a boundary face of a road.

Figure 7:
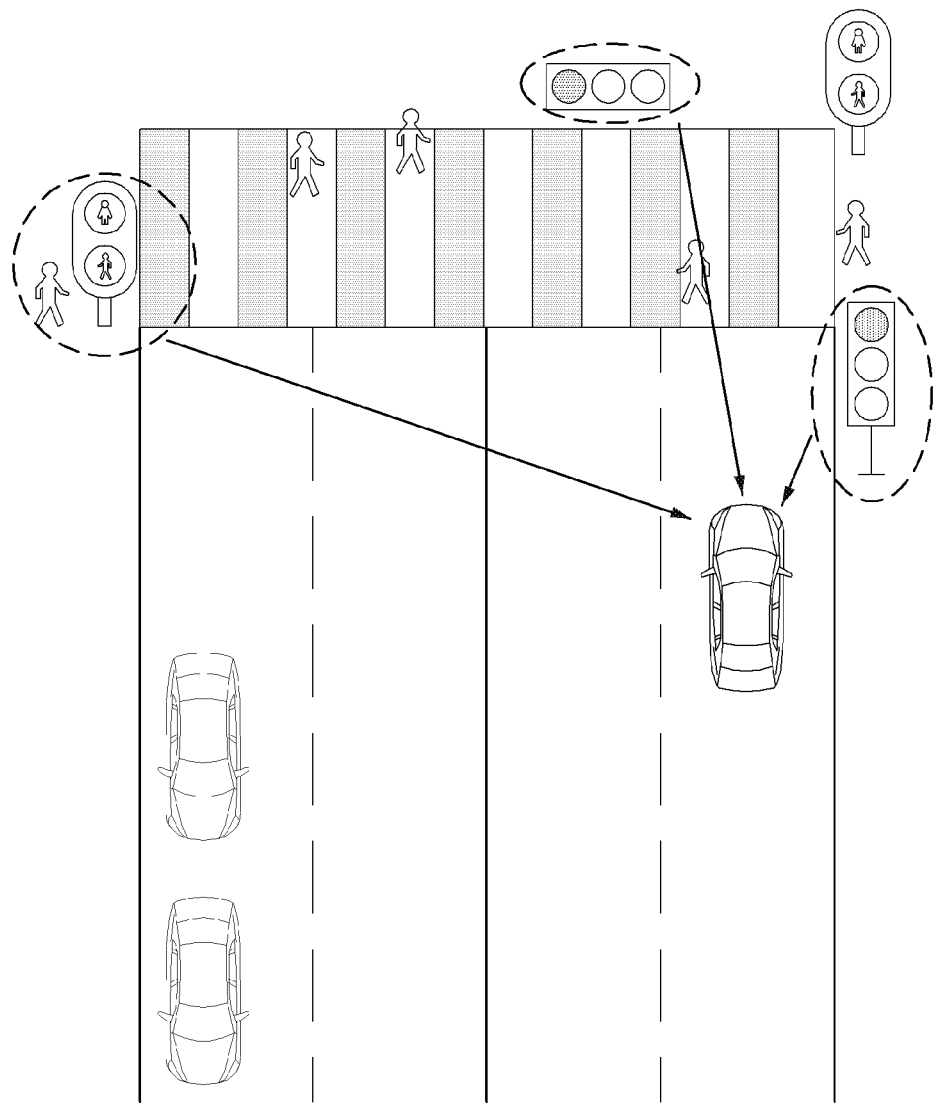
FIG. 7 illustrates a situation in which a fourth data extracting device, which is included in a U-turn strategy determining device of an autonomous driving vehicle, extracts lighting states of traffic lights as fourth group data.

As shown in FIG. 7, the fourth data extracting device 234 acquires a lighting state of each traffic light located around the autonomous driving vehicle based on the infrastructure information and the location information and extracts a lighting state of a traffic light associated with the U-turn of the autonomous driving vehicle from the acquired lighting state of each traffic light as fourth group data. In this connection, the traffic light may include a vehicle traffic light and a pedestrian traffic light associated with the U-turn of the autonomous driving vehicle.

Figure 8A:
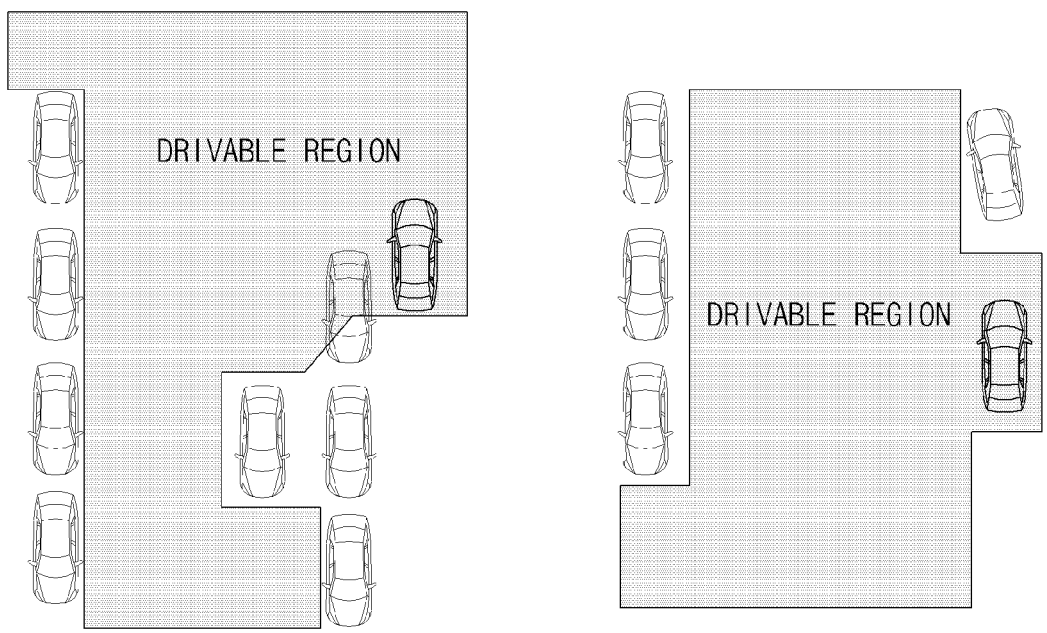
FIGS. 8A to 8B illustrate drivable regions extracted by a fifth data extracting device included in a U-turn strategy determining device of an autonomous driving vehicle as fifth group data.
Figure 8B:
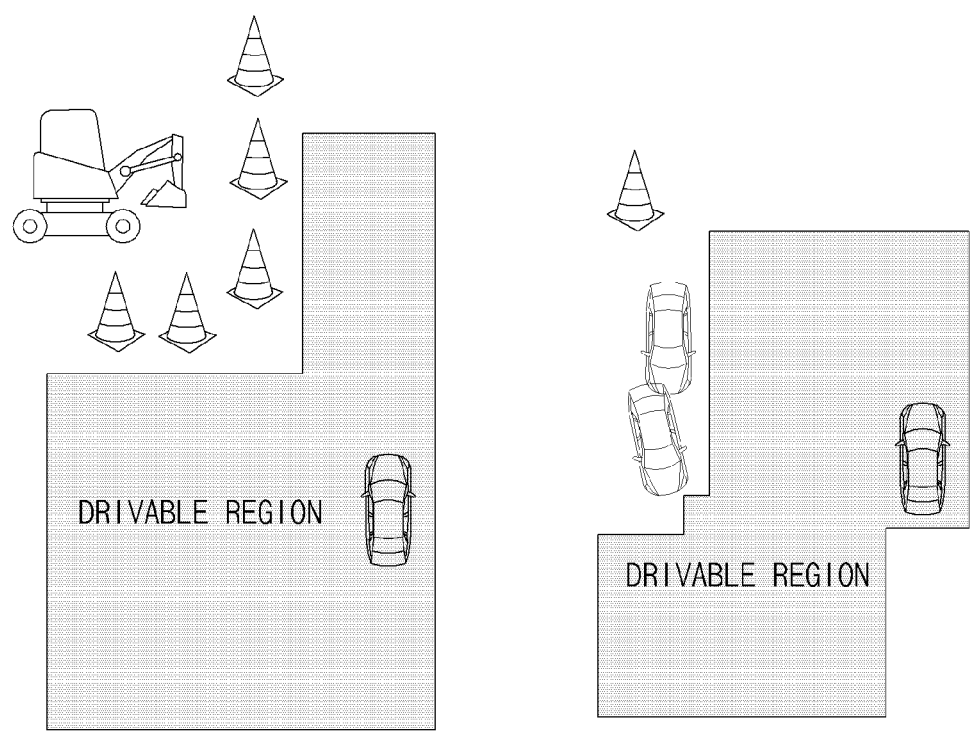

As shown in FIGS. 8A and 8B, the fifth data extracting device 235 extracts a drivable region based on a distribution of static objects, a drivable region based on a construction section, and a drivable region based on an accident section as fifth group data based on the object information. In this connection, the drivable region means a region on a lane opposite to a lane where the autonomous driving vehicle is located. In an example, when the autonomous driving vehicle is located in a lane for traveling from one direction to the other direction, the opposite lane means a lane for traveling from the other direction to one direction.

Figure 9A:
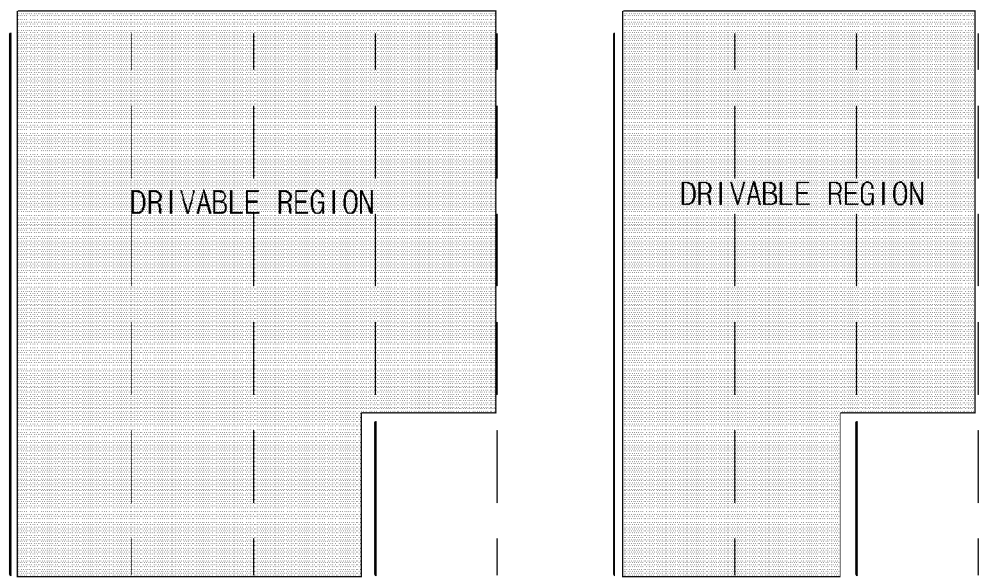
FIGS. 9A to 9B illustrate drivable regions extracted by a sixth data extracting device included in a U-turn strategy determining device of an autonomous driving vehicle as sixth group data.
Figure 9B:
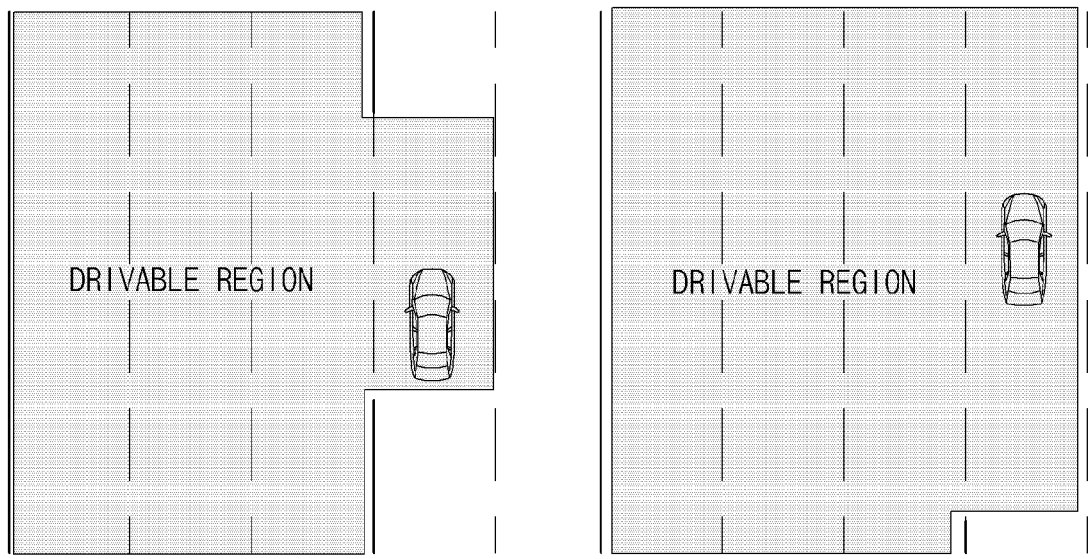

As shown in FIGS. 9A and 9B, the sixth data extracting device 236 extracts a drivable region based on a structure of the road as sixth group data based on the infrastructure information. In this connection, the sixth data extracting device 236 may extract the drivable region from the image captured by the camera or extract the drivable region based on a position of the autonomous driving vehicle on the precise map. In this connection, the drivable region means a region on the lane opposite to the lane where the autonomous driving vehicle is located.

Figure 10:
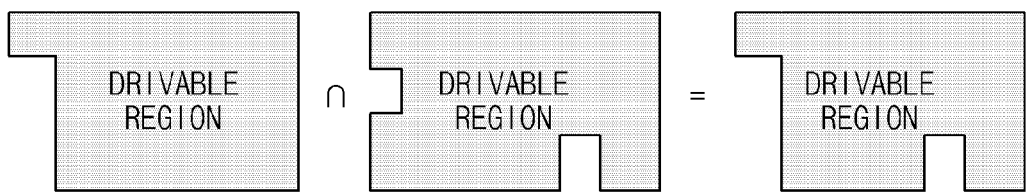
FIG. 10 illustrates a final drivable region extracted by a seventh data extracting device included in a U-turn strategy determining device of an autonomous driving vehicle as seventh group data.

As shown in FIG. 10, the seventh data extracting device 237 extracts an overlapping region (final drivable region) of the drivable region extracted by the fifth data extracting device 235 and the drivable region extracted by the sixth data extracting device 236 as seventh group data.

The learning device 30 learns, based on the deep learning, the U-turn strategy for each situation using the data extracted by the first data extracting device 231, the data extracted by the second data extracting device 232, the data extracted by the third data extracting device 233, the data extracted by the fourth data extracting device 234, and the data extracted by the seventh data extracting device 237.

Such result learned by the learning device 30 may be used by a strategy determining device 41 to determine the U-turn strategy.

The learning device 30 may use, as an artificial neural network, at least one of a convolutional neural network (CNN), a recurrent neural network (RNN), a restricted boltzmann machine (RBM), a deep belief network (DBN), deep Q-networks, a generative adversarial network (GAN), and/or a softmax. In this connection, the number of hidden layers of the artificial neural network is at least 10. Further, the number of hidden nodes in the hidden layer may be at least 500, but is not limited thereto.

The controller 40 may include the strategy determining device 41 and a risk determining device 42 as function blocks.

The strategy determining device 41 may determine the U-turn strategy of the autonomous driving vehicle by applying the data extracted by the first data extracting device 231, the data extracted by the second data extracting device 232, the data extracted by the third data extracting device 233, the data extracted by the fourth data extracting device 234, and the data extracted by the seventh data extracting device 237 to the result learned by the learning device 30.

The strategy determining device 41 may adjust the score of each U-turn strategy for each situation stored in the storage 10 based on a risk (e.g., the number of collision warnings) determined by the risk determining device 42 in a process of U-turning based on the determined U-turn strategy.

The risk determining device 42 may determine the risk in various ways such as a time to collision (TTC), a driving prediction route, a grid map, or the like.

For example, when the risk is determined based on the TTC, the risk determining device 420 may determine the risk by counting the number of times that the TTC falls equal to or below a threshold (the number of warnings). For example, it may be determined that there is a risk even when the warning occurs once and it may be determined that the risk is high as the number of warnings increases.

Figure 11:
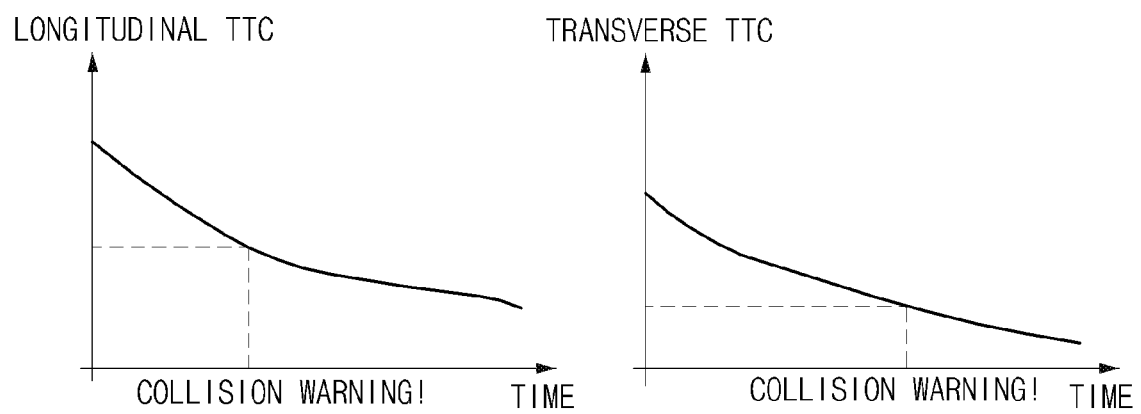
FIG. 11 illustrates a process of determining a risk by a risk determining device included in a U-turn strategy determining device of an autonomous driving vehicle.

When the risk determining device 42 determines the risk based on the TTC, it is desirable to determine the risk in consideration of a transverse TTC as well as a longitudinal TTC as shown in FIG. 11.

Figure 12:
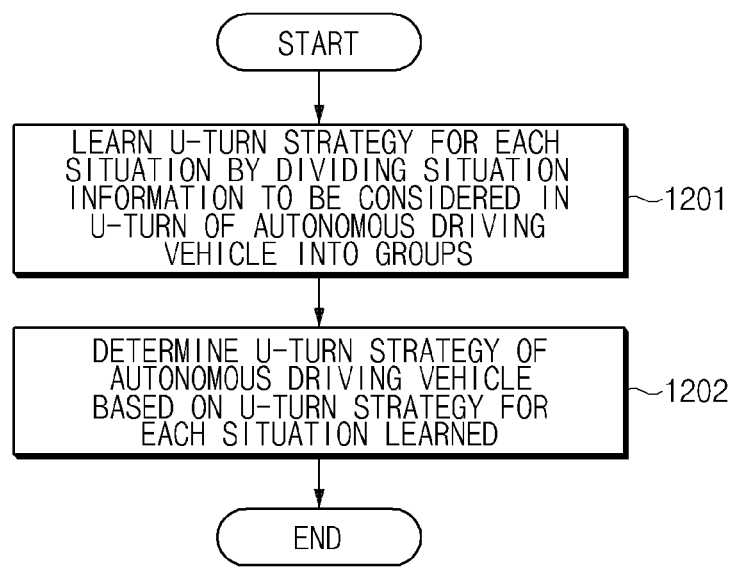
FIG. 12 is a flowchart of a U-turn strategy determination method of an autonomous driving vehicle.

FIG. 12 is a flowchart of a U-turn strategy determination method of an autonomous driving vehicle according to one form of the present disclosure.

First, the learning device 30 learns the U-turn strategy for each situation by dividing the situation information to be considered in the U-turn of the autonomous driving vehicle into the groups (1201).

Thereafter, the controller 30 determines the U-turn strategy of the autonomous driving vehicle based on the U-turn strategy for each situation learned by the learning device 30 (1202).

Figure 13:
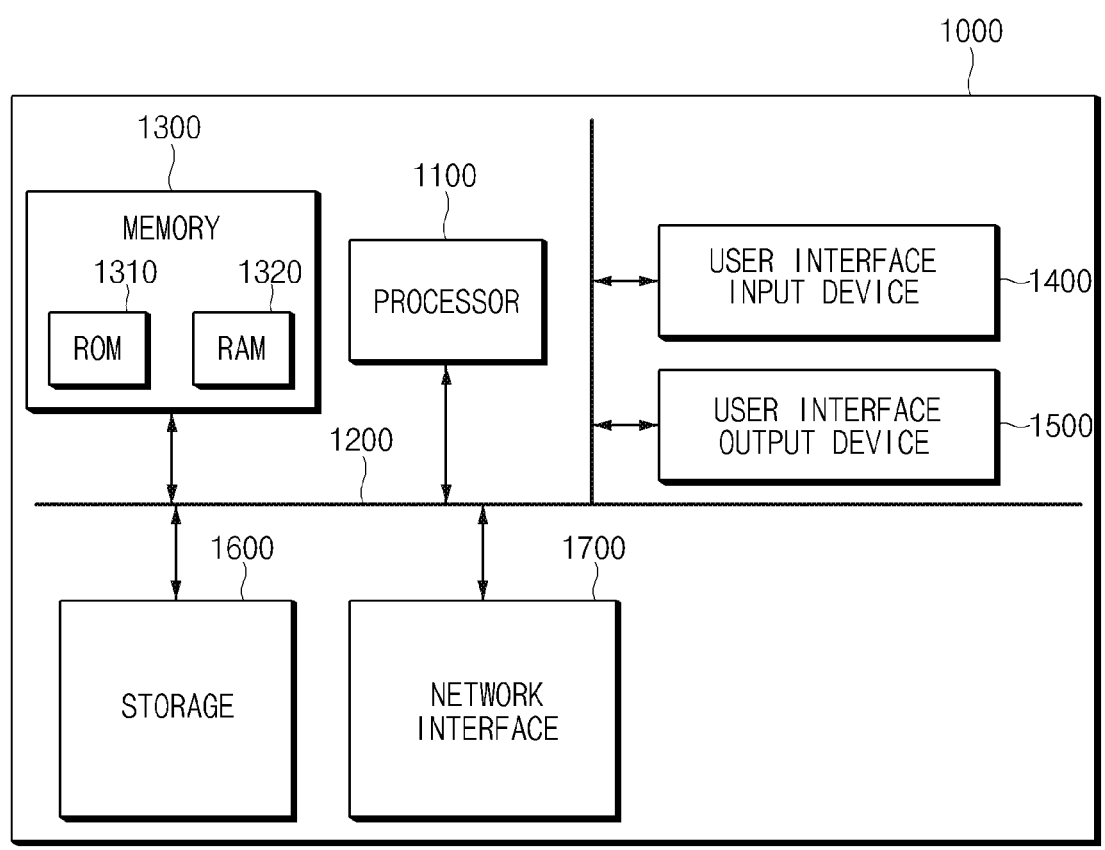
FIG. 13 is a block diagram illustrating a computing system for implementing a method for determining a U-turn strategy of an autonomous driving vehicle.

FIG. 13 is a block diagram illustrating a computing system for implementing a method for determining a U-turn strategy of an autonomous driving vehicle according to one form of the present disclosure.

With reference to FIG. 13, the method for determining the U-turn strategy of the autonomous driving vehicle according to one form of the present disclosure described above may also be implemented through a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium that is, the memory 1300 and/or the storage 1600 such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the characteristics of the present disclosure.

Therefore, the forms disclosed in the present disclosure are not intended to limit the technical idea of the present disclosure but to illustrate the present disclosure, and the scope of the technical idea of the present disclosure is not limited by the forms. The scope of the present disclosure should be construed as being covered by the scope of the appended claims, and all technical ideas falling within the scope of the claims should be construed as being included in the scope of the present disclosure.

The device and the method for determining the U-turn strategy of the autonomous driving vehicle of one form of the present disclosure perform the deep learning by dividing the various situation information to be considered for the safety during the U-turn of the autonomous driving vehicle into the groups and determine the U-turn strategy of the autonomous driving vehicle based on such learned result, thereby generating the optimal travel route in the U-turn process of the autonomous driving vehicle and greatly reducing accidents that may occur in the U-turn process of the autonomous driving vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A device for determining a U-turn strategy of an autonomous driving vehicle, the device comprising:
    a learning device configured to learn a U-turn strategy for each situation by dividing situation information to be considered in a U-turn of the autonomous driving vehicle into groups; and
    a controller configured to determine the U-turn strategy of the autonomous driving vehicle based on the U-turn strategy for each situation learned by the learning device.

2. The device of claim 1, further comprising:
    storage configured to store a plurality of U-turn strategies for each situation.

3. The device of claim 2, wherein the plurality of U-turn strategies matches with scores corresponding to the learning result, respectively.

4. The device of claim 3, wherein the controller is configured to determine a U-turn strategy having a highest score among the plurality of U-turn strategies corresponding to a current situation as the U-turn strategy of the autonomous driving vehicle.

5. The device of claim 3, wherein the controller is configured to adjust a score of each U-turn strategy corresponding to a current situation based on a risk obtained during the U-turn of the autonomous driving vehicle.

6. The device of claim 5, wherein the risk is the number of collision warnings.

7. The device of claim 2, wherein the plurality of U-turn strategies includes at least two U-turn strategies among a first U-turn strategy of a U-turn with a first radius, a second U-turn strategy of a U-turn with a second radius, a third U-turn strategy of a U-turn following after a U-turn of a preceding vehicle, a fourth U-turn strategy of a U-turn restarted after a short stop during the U-turn, and a fifth U-turn strategy of a U-turn restarted after reversing during the U-turn.

8. The device of claim 1, further comprising:
    an input device configured to input data for each group for situation information at a current time point.

9. The device of claim 8, wherein the input device includes
    at least one data extracting device among:
    a first data extracting device configured to extract first group data for inhibiting a collision with a preceding vehicle U-turning ahead in front of the autonomous driving vehicle when the autonomous driving vehicle is U-turning,
    a second data extracting device configured to extract second group data for inhibiting a collision with a neighboring vehicle during the U-turn of the autonomous driving vehicle,
    a third data extracting device configured to extract third group data for inhibiting a collision with a pedestrian during the U-turn of the autonomous driving vehicle,
    a fourth data extracting device configured to extract, as fourth group data, lighting states of various traffic lights located in front of the autonomous driving vehicle during the U-turn of the autonomous driving vehicle,
    a fifth data extracting device configured to extract a drivable region based on a distribution of static objects, a drivable region based on a construction section, and a drivable region based on an accident section as fifth group data,
    a sixth data extracting device configured to extract a drivable region based on a structure of a road as sixth group data, and
    a seventh data extracting device configured to extract an overlapping region of the drivable region extracted by the fifth data extracting device and the drivable region extracted by the sixth data extracting device as seventh group data.

10. The device of claim 9, wherein the first group data includes at least one of a lighting state of a traffic light, a yaw rate, or a cumulative value of a longitudinal acceleration over time,
    wherein the second group data includes at least one of a position, a speed, an acceleration, a yaw rate, or a direction of traveling of the neighboring vehicle, and
    wherein the third group data includes at least one of a location, a speed, a direction of traveling, or a precise map of surroundings of the pedestrian.

11. A method for determining a U-turn strategy of an autonomous driving vehicle, the method comprising:
    learning, by a learning device, a U-turn strategy for each situation by dividing situation information to be considered in a U-turn of the autonomous driving vehicle into groups; and
    determining, by a controller, the U-turn strategy of the autonomous driving vehicle based on the U-turn strategy for each situation learned by the learning device.

12. The method of claim 11, further comprising:
    storing, by storage, a plurality of U-turn strategies for each situation.

13. The method of claim 12, wherein the plurality of U-turn strategies matches with scores corresponding to the learning result, respectively.

14. The method of claim 13, wherein determining the U-turn strategy of the autonomous driving vehicle includes:

determining a U-turn strategy having a highest score among the plurality of U-turn strategies corresponding to a current situation as the U-turn strategy of the autonomous driving vehicle.

15. The method of claim 12, wherein the plurality of U-turn strategies includes at least two U-turn strategies among a first U-turn strategy of a U-turn with a first radius, a second U-turn strategy of a U-turn with a second radius, a third U-turn strategy of a U-turn following after a U-turn of a preceding vehicle, a fourth U-turn strategy of a U-turn restarted after a short stop during the U-turn, and a fifth U-turn strategy of a U-turn restarted after reversing during the U-turn.

16. The method of claim 13, further comprising:
adjusting, by the controller, a score of each U-turn strategy, among the plurality of U-turn strategies, corresponding to a current situation based on a risk obtained during the U-turn of the autonomous driving vehicle.

17. The method of claim 16, wherein the risk is the number of collision warnings.

18. The method of claim 11, further comprising:
inputting, by an input device, data for each group for situation information at a current time point.

19. The method of claim 18, wherein inputting the data for each group includes:
extracting first group data for inhibiting a collision with a preceding vehicle U-turning ahead in front of the autonomous driving vehicle when the autonomous driving vehicle is U-turning;
extracting second group data for inhibiting a collision with a neighboring vehicle during the U-turn of the autonomous driving vehicle;
extracting third group data for inhibiting a collision with a pedestrian during the U-turn of the autonomous driving vehicle;
extracting, as fourth group data, lighting states of various traffic lights located in front of the autonomous driving vehicle during the U-turn of the autonomous driving vehicle;
extracting a drivable region based on a distribution of static objects, a drivable region based on a construction section, and a drivable region based on an accident section as fifth group data;
extracting a drivable region based on a structure of a road as sixth group data; and
extracting an overlapping region of the drivable region of the fifth group data and the drivable region of the sixth group data as seventh group data.

20. The method of claim 19, wherein the first group data includes at least one of a lighting state of a traffic light, a yaw rate, or a cumulative value of a longitudinal acceleration over time,
wherein the second group data includes at least one of a position, a speed, an acceleration, a yaw rate, or a direction of traveling of the neighboring vehicle, and
wherein the third group data includes at least one of a location, a speed, a direction of traveling, or a precise map of surroundings of the pedestrian.

\* \* \* \* \*